United States Patent [19]

Koyama et al.

[11] Patent Number: 4,508,893
[45] Date of Patent: Apr. 2, 1985

[54] PROCESS FOR THE PREPARATION OF A POWDERY CALCIUM CELLULOSE GLYCOLATE

[75] Inventors: Takahiro Koyama, Himeji; Haruo Matsumura; Teturo Morita, both of Itami, all of Japan

[73] Assignees: Daicel Chemical Industries Ltd.; Nichirin Chemical Industries Ltd., both of Japan

[21] Appl. No.: 643,648

[22] Filed: Aug. 23, 1984

[30] Foreign Application Priority Data

Aug. 25, 1983 [JP] Japan ................... 58-156187
Aug. 29, 1983 [JP] Japan ................... 58-158741

[51] Int. Cl.$^3$ .................... C08B 11/20; C08B 11/00
[52] U.S. Cl. ......................... 536/85; 536/97; 536/98; 536/101
[58] Field of Search ............... 424/362; 536/85, 97, 536/98, 101

[56] References Cited

U.S. PATENT DOCUMENTS

| | | | |
|---|---|---|---|
| 4,235,937 | 11/1980 | Remer | 426/486 |
| 4,269,256 | 5/1981 | Nakazawa et al. | 524/556 |
| 4,269,859 | 5/1981 | Morse | 424/362 |
| 4,305,933 | 12/1981 | Wiczer | 424/362 |
| 4,370,353 | 1/1983 | Yagi et al. | 426/456 |
| 4,457,908 | 7/1984 | Scott | 424/49 |

FOREIGN PATENT DOCUMENTS 493366  6/1953  Canada ...................... 536/85

Primary Examiner—Ronald W. Griffin
Attorney, Agent, or Firm—Hubbell, Cohen, Stiefel & Gross

[57] ABSTRACT

A process for the preparation of a powdery calcium cellulose glycolate which comprises reacting cellulose glycolic acid in wet form with a calcium reagent, drying and pulverizing the resultant, wherein the calcium reagent is calcium hydroxide or a combination of calcium hydroxide and calcium carbonate.

8 Claims, No Drawings

PROCESS FOR THE PREPARATION OF A POWDERY CALCIUM CELLULOSE GLYCOLATE

BACKGROUND OF THE INVENTION (1) Field of the Invention

The present invention relates to a process for the preparation of a powdery calcium cellulose glycolate and a use of the powdery calcium cellulose glycolate as a disintegrator for solid pharmaceutical preparations.

(2) Description of the Prior Art

Calcium cellulose glycolate is widely used as a disintegrator for solid pharmaceutical preparations, because it is tasteless, odorless and white-colored and has many merits such as excellent disintegrating property, excellent degree of swelling and excellent compression molding property. It is commercially available e.g., under the trade name ECG-505 (from NICHIRIN CHEMICAL INDUSTRIES LTD. in Japan). However, it is pointed out that, when a disintegrator is used in a large amount, the hardness of the resulting solid pharmaceutical preparation becomes short.

The calcium cellulose glycolate now available commercially is prepared basically according to the process described in the specification of Japanese Patent Publication No. 7960/1968. That is, the calcium cellulose glycolate is prepared by reaction of a purified cellulose glycolic acid having a degree of substitution by carboxymethyl group per anhydrogluocse unit of 0.2–0.8, with calcium carbonate under such conditions that the water content during the reaction is 30–80%, which is followed by drying, pulverizing and sieving. In said specification, various calcium reagents to be reacted with cellulose glycolic acid are mentioned. However, it is described that calcium acetate, calcium phosphate and calcium chloride are not employed because acetic acid, phosphoric acid and hydrochloric acid are formed, respectively, by neutralization reaction and calcium hydroxide is also not employed because, on neutralization reaction, the reaction system becomes viscous and shows partical coagulation. Thus, it is described that only calcium carbonate can be used practically.

SUMMARY OF THE INVENTION

The inventors of the present invention have made investigation on the neutralizing agent, i.e., calcium reagents to be used for the neutralization reaction, and on the conditions for the neutralization and found that by replacing a part or the whole of calcium carbonate required for the neutralization with calcium hydroxide and selecting the conditions for the neutralization, a calcium cellulose glycolate having excellent properties as a disintegrator can be prepared.

Thus, the present invention provides a process for the preparation of a powdery calcium cellulose glycolate which comprises reacting cellulose glycolic acid in wet form with a calcium reagent, drying and pulverizing the resultant, wherein the calcium reagent is calcium hydroxide or a combination of calcium hydroxide and calcium carbonate. According to the present invention, a calcium cellulose glycolate having a disintegrating propery of the same or somewhat minor degree as the conventional product but giving solid pharmaceutical preparations of higher hardness and further a calcium cellulose glycolate having relatively higher bulk density which provides a quantitative supply when it is used as a disintegrator of a solid pharmaceutical preparation such as tablets can be prepared.

DESCRIPTION OF THE PREFERRED EMBODIMENT

On carrying out the process of the present invention, it is requested that the cellulose glycolic acid used is wetted and has a water content of 30–80% by weight. When calcium hydroxide is used as the calcium reagent, water is formed by the neutralization reaction as by-product. However, it is sufficient for the process of this invention to regulate only the water content of the starting material within the above-mentioned range. It is not necessary to take the amount of water formed in the course of reaction into consideration. When a combination of calcium carbonate and calcium hydroxide is used, the neutralization reaction is preferably carried out by reacting first calcium carbonate only for at least 1 hour, and then adding calcium hydroxide to the reaction mixture to continue the reaction further for approximately 1 hour.

When the molar ratio of calcium hydroxide to calcium carbonate is lower (rich in calcium carbonate), than 20/80, the two calcium reagents may be added also at one time. When the molar ratio of calcium hydroxide to calcium carbonate is higher (poor in calcium carbonate) than 80/20, it is unfavorable to carry out the reaction at a temperature higher than 40° C. since the reaction system becomes viscous and a large amount of energy is required for the stirring of it and moreover the disintegrating property of the product is reduced. Even when the ratio of calcium hydroxide is high, however, a product having not so bad disintegrating property and giving tablets of high hardness may be obtained by carrying out the neutralization while controlling the reaction temperature strictly below 40° C., preferably, at approximately 35° C. In this case, it is suitable for the control of reaction temperature to add the calcium hydroxide dividedly.

The process of the present invention is also suitable for obtaining a powdery calcium cellulose glycolate having a relatively high bulk density and being excellent in a property of quantitative supply.

On preparing tablets, calcium cellulose glycolate is conventionally used in an amount of 2–15% of the total weight of the tablets to give them a disintegrating property. However, calcium cellulose glycolate is of relatively low fluidity in a powder/granule composition and to apt to form bridges in mortars of a tablet-molding machine, e.g. having a diameter of 3–20 mm and a depth of 7–10 mm. Therefore, calcium cellulose glycolate has a tendency to injure the quantitative supply of the powder/granule composition. Injury of the quantitative supply causes fluctuation of the weight of tablets, the amount of pharmaceutically active ingredients and the hardness of tablets, and accordingly is undesirable from the point of workability and uniform quality of the product.

The inventors of the present invention have found that the quantitative supply of a powder/granule composition depends in large degree on the value of the bulk density of the calcium cellulose glycolate used, and recognized that, when a calcium cellulose glycolate having a high bulk density is used, the quantitative supply of the powder/granule composition for molding tablets is performed well and tablets showing no fluctuation in weight and hardness are obtained.

For the preparation of a calcium cellulose glycolate having a high bulk density, it is preferable to use a cellulose glycolic acid having a high degree of substitution by an ether group per anhydroglucose unit and effect the neutralization at a relatively high pH zone while holding a relatively high water content and stirring with strong shear.

As for a degree of neutralization of the calcium cellulose glycolate which is shown with a pH value in the modium of 1% by weight dispersion of calcium cellulose glycolate in distilled water, it is noted that the reaction velocity of the neutralization of a cellulose glycolic acid with a calcium reagent is very much reduced as the pH of the reaction system approaches the neutral point when calcium carbonate is used as the calcium reagent. Therefore, in order to obtain a product whose degree of neutralization is prescribed at the neutral to a weakly alkaline zone, it is especially valuable for industrial performance to use calcium carbonate at the first term and calcium hydroxide at the latter term of the reaction.

On the other hand, a bulk density within the range from 550 g/l to 900 g/l is practically advantageous to perform the quantitative supply well. With a calcium cellulose glycolate having a bulk density lower than 500 g/l, any difference over the conventional commercial product can not be recognized in respect of the quantitative supply. A calcium cellulose glycolate having a bulk density higher than 900 g/l is difficult to prepare and, even if it is prepared, there is a possibility that its uniform mixing with the other ingredients of the powder/granule composition becomes difficult, because bulk density of the other ingredient is lower than 900 g/l. As already mentioned, it is preferable for the preparation of a product having a high bulk density to use a cellulose glycolic acid having a high degree of substitution by an ether group per anhydroglucose unit and a higher degree of neutralization. For obtaining a product having a bulk density higher than 550 g/l, it can be said by experience that it is preferable to satisfy the following equation:

(numerical value showing the degree of substitution)
× (numerical value showing pH) > 2.7

The term "bulk density" herein used means a value determined according to the following method:

Method of determining a bulk density:

In a measuring cylinder of 200 ml volume, a powdery sample is introduced and stratified slowly up to the graduation of 200 ml. The measuring cylinder is lifted so that its bottom takes off the floor by 5cm, and then allowed to fall on the floor. After this operation is repeated 10 times, the volume (ml) of the sample is checked and then the sample is weighed.

Bulk density (g/l) = [weight (g)/volume(ml)] × 1,000

The invention of the present invention is explained concretely by giving examples, hereinafter.

A degree of substitution by carboxymethyl group per anhydroglucose unit of cellulose glycolic acid (DS) used in the following examples was determined as follows:

One gram of cellulose glycolic acid (calculated as being pure) was dissolved in a flask containing 200 ml of pure water and 100 ml of N/10 NaOH. Next, the excess of N/10 NaOH was titrated with N/10 H₂SO₄ using the phenolphthalein as an indicator. The DS was calculated from the following equation based on the amount of titrant, Bml, added.

$$DS = \frac{162(100f_2 - Bf_1)}{10000 - 58(100f_2 - Bf_1)}$$

where
$f_1$: factor of N/10 H$_2$SO$_4$
$f_2$: factor of N/10 NaOH

REFERENTIAL EXAMPLE 1

One hundred parts by weight of a wet purified cellulose glycolate (its DS was 0.53) having a water content of 70% by weight were introduced in a ribbon blender and 3.0 parts by weight of powdery calcium carbonate were added thereto. The neutralization reaction was performed at 40° C. for 2 hours, in accordance with the process as described in Example 1 given in the specification of Japanese Patent Publication No. 7960/1968. After the neutralization reaction, the product was dried in a hot-air dryer and pulverized into a powder passing through 200 mesh (Tyler).

The properties of the calcium cellulose glycolate obtained were determined and are shown in Table 1.

Next, imitation tablets not containing medicine were prepared using the above powdery sample as disintegrator, according to the following prescription (composition: 0.75 g, tablet-molding pressure: 4 t, tablet diameter: 15 mm):

| Constitution of tablets: | Lactose | 93.5% |
| --- | --- | --- |
| | Disintegrator | 5.0% |
| | Talc | 1.0% |
| | Magnesium stearate | 0.5% |
| | | 100.0% |

The molded tablets showed a disintegration time of 61 seconds as determined in an artificial gastric juice (of a temperature of 36°–37° C.) and a hardness of 7.5 kg as determined by Monsanto's hardness tester, which are also shown in Table 1.

EXAMPLE 1

To 100 parts by weight of the same wet cellulose glycolic acid as used in Referential Example 1 were added 2.44 parts by weight of powdery calcium carbonate (corresponding to 81.3 mol% of the calcium reagent in Referential Example 1), and the reaction was performed at 40° C. for 1 hour. Then, 0.42 part by weight of powdery calcium hydroxide (corresponding to 18.7 mol%) was added and the reaction was performed at 40° C. for further 1 hour. The properties of the powdery calcium cellulose glycolate obtained after drying and pulverizing (which were effected in accordance with Referential Example 1) and the imitation tablets made of the obtained product according to the above example were determined, and are shown in Table 1.

EXAMPLES 2-6

Powdery calcium cellulose glycolates were prepared by first adding calcium carbonate to 100 parts by weight of the same wet cellulose glycolic acid as used in Example 1 to perform the reaction and then adding calcium hydroxide to perform the reaction further, in accordance with Example 1. The molar ratio of calcium carbonate to calcium hydroxide used was 37.8/62.2 in Example 2, 47.1/52.9 in Example 3, 56.7/43.3 in Example 4, 66.0/34.0 in Example 5 and 75.5/24.5 in Example 6. The properties of the product of each Example and their imitation were determined and are shown in Table 1.

The product of each Example was dried and pulverized. The properties of the powdery product obtained were determined and are shown in Table 1.

TABLE 1

| No. | $\frac{Ca(OH)_2}{CaCO_3}$ molar ratio | Properties of calcium cellulose glycolate | | | | | Properties of tablets | |
|---|---|---|---|---|---|---|---|---|
| | | *Water content (%) | Degrees of neutralization (pH) | **Ignition residue (%) | Bulk density (g/l) | ***Angle of repose (°) | Hardness (Kg) | Disintegrating property (second) |
| Referential Example 1 | 0/100 | 8.3 | 4.9 | 16.1 | 470 | 45 | 7.5 | 61 |
| Example 1 | 18.7/81.3 | 8.4 | 5.0 | 16.0 | 483 | 44 | 8.3 | 60 |
| Example 2 | 37.8/63.2 | 9.3 | 5.1 | 16.1 | 485 | 44 | 9.3 | 70 |
| Example 3 | 47.1/52.9 | 9.1 | 5.1 | 16.0 | 484 | 43 | 13.2 | 70 |
| Example 4 | 56.7/43.3 | 9.0 | 5.1 | 15.9 | 515 | 42 | 14.6 | 81 |
| Example 5 | 66.0/34.0 | 9.2 | 5.0 | 15.9 | 504 | 40 | 15.0 | 80 |
| Example 6 | 75.5/24.5 | 9.1 | 5.0 | 16.2 | 517 | 38 | 15.1 | 78 |
| Example 7 | 84.9/15.1 | 9.2 | 5.0 | 16.5 | 539 | 36 | 13.6 | 90 |
| Example 8 | 94.4/5.6 | 8.7 | 4.9 | 15.5 | 549 | 36 | 12.0 | 98 |
| Example 9 | 100/0 | 8.0 | 4.8 | 15.7 | 539 | 35 | 13.4 | 90 |
| Example 10 | 100/0 | 8.3 | 5.1 | 16.0 | 546 | 36 | 15.2 | 70 |

*Water content: Loss in weight on drying determined in accordance with the method of Japanese Pharmacopeia
**Ignition residue: Determined in accordance with the method of Japanese Pharmacopeia
***Angle of repose: Determined by Miwa type measuring apparatus of angle of respose

1.

EXAMPLES 7–8

Powdery calcium cellulose glycolates were prepared by first adding calcium carbonate to 100 parts by weight of the same wet cellulose glycolic acid as used in Example 1 to perform reaction and then adding calcium hydroxide to perform the reaction further, in accordance with Example 1. The molar ratio of calcium carbonate to calcium hydroxide used was 15.1/84.9 in Example 7 and 5.6/94.4 in Example 8. In these Examples, generation of heat was observed as calcium hydroxide was added, and the temperature of the reaction system was raised frequently over 40° C. However, the temperature was adjusted by external cooling so that it did not exceed 45° C. During the neutralization by calcium hydroxide, the product showed a tendency to coagulate.

EXAMPLES 9–10

To 100 parts by weight of the same wet cellulose glycolic acid as used in Referential Example 1 were added 2.23 parts by weight of powdery calcium hydroxide and the reaction was performed at 40° C. for 2 hours. Although generation of heat by neutralization reaction was observed, the reaction system was maintained by external cooling so that it did not exceed 45° C. (Example 9).

To 100 parts by weight of the same wet cellulose glycolic acid were added 1.23 parts by weight of powdery calcium hydroxide and the reaction was performed at 35° C. for 1 hour. Then, 1.00 part by weight of calcium hydroxide was further added and the reaction was performed at 35°–40° C. (Example 10).

From the results as mentioned above, it can be said as follows:

(a) Tablets (of Referential Example 1) prepared by using as disintegrator a calcium cellulose glycolate obtained according to the process of Japanese Patent Publication No. 7960/1968 wherein only calcium carbonate is used as the calcium reagent are excellent in their disintegrating property, but low in their hardness.

(b) Tablets (of Examples 1–6) prepared by using a disintegrator which is prepared by using a combination of calcium hydroxide and calcium carbonate as the calcium reagent and maintaining the reaction temperature at 40° C. are somewhat inferior (except tablets of Example 1) to tablets of Referential Example 1 in their disintegrating property, but excellent in their hardness. The higher the molar ratio of calcium hydroxide is, the higher the hardness of the tablets obtained is.

However, when the reaction temperature is somewhat elevated (40°–45° C.) (Examples 7 and 8), there is tendency of somewhat lowering the properties of the tablets obtained as compared with the above Examples 1–6.

(c) Tablets (of Example 9) obtained by using only calcium hydroxide as the calcium reagent, introducing the calcium hydroxide at one time and controlling the reaction temperature below 45° C. are high in their hardness, but low in their disintegrating property.

(d) Tablets (of Example 10) obtained by using only calcium hydroxide as the calcium reagent, introducing the calcium hydroxide dividedly and controlling the reaction temperature at 35°–40° C. are excellent in both their hardness and disintegrating property.

EXAMPLE 11

In order to prepare samples having different bulk densities, two parts by weight of each of purified cellulose glycolic acid having various DS were wetted to have the water content of 75% by weight and introduced into a ribbon blender. After adding thereto 2.5 parts by weight of powdery calcium carbonate, the reaction was performed at 40° C. for 1 hour while blending. Then, powdery calcium hydroxide was suitably added and the reaction was performed at 40° C. further for 1 hour. The calcium cellulose glycolate obtained was dried and pulverized, and the properties of the powdery calcium cellulose glycolate were determined, in accordance with above mentioned methods. The results are as follows:

| Samples | Ca(OH)$_2$ | DS | Degree of neutralization (pH) | Water content (%) | Bulk density (g/l) | Ignition residue (%) |
|---|---|---|---|---|---|---|
| A | not added | 0.53 | 5.2 | 3.6 | 514 | 15.9 |
| B | added | 0.69 | 5.0 | 2.5 | 698 | 23.9 |
| C | added | 0.58 | 4.9 | 4.2 | 651 | 19.2 |
| D | added | 0.50 | 7.1 | 4.2 | 610 | 19.4 |

The above sample A have the properties corresponding to the standard of commercially available ECG-505.

Using as disintegrator each of the calcium cellulose glycolates having different bulk densities thus obtained, a powder/granule composition was prepared by mixing it with ascorbic acid or aspirin as the pharmaceutically active ingredient and a microcrystalline cellulose ("AVICEL" pH 101, product of Asahi Chemical Industry Co., Ltd.) as excipient. From the composition, tablets were prepared by a direct molding method. Constitution of each powder/granule composition and condition of molding it into tablets were as follows:

Constitution of the powder/granule composition-1

| | |
|---|---|
| Ascorbic acid | 50.0 |
| Avicel (passing through 80 mesh and not passing through 200 mesh) | 42.0 |
| Disintegrator | 5.0 |
| Talc | 2.5 |
| Magnesium stearate | 0.5 |
| | 100.0 % by weight |

Constitution of the powder/granule composition-2

| | |
|---|---|
| Aspirin (passing through 60 mesh and not passing through 100 mesh) | 55.0 |
| Avicel (passing through 80 mesh and not passing through 200 mesh) | 37.1 |
| Disintegrator | 5.0 |
| Talc | 2.4 |
| Lubricating wax | 0.5 |
| | 100.0 % by weight |

Condition of tablet-molding

Tablet-molding machine: A rotary powder molding machine No. 8F-3B of Kikusui Works Ltd.

Molding condition:
  Diameter of tablet: 7.6 mm
  Thickness of Tablet: approx. 4.0 mm The powder/granule composition was supplied into the molding machine by open feeding, and the tablet-molding was effected with various depth of filling powder and various level of tablet-molding pressure. The mean weight and weight deviation (n=30), the mean hardness and hardness deviation (n=5), the degree of loss by abrasion and disintegrating property of the tablets obtained were determined. Determination of the hardness, degree of loss by abrasion and disintegrating property was effected according to the following method:

Hardness: Monsanto's hardness tester

Degree of loss by abrasion: Kayagaki's tester for degree of loss by abrasion

The weight of pulverized matter formed as 100 tablets are treated at 25 revolutions for 20 minutes is shown by percentage.

Disintegrating property: Tester for disintegrating property, conformed to the Japanese pharmacopoeia (made by Toyama Sangyo Co., Ltd.)

Temperature of determination: 37±2° C.

Test liquor: Water and the first liquor stipulated by the Japanese pharmacopoeia (artificial gastric juice)

n=10: Shown by the mean value (seconds) of the time necessary for disintegration The results obtained by determination of the property of tablets, using 50 tablets for determination of weight and 20 tablets for determination of hardness, are shown in the following Table 2 and Table 3:

TABLE 2

| Pharmaceutically active ingredient | Disintegrator | Depths of filling (mm) | Tablet-molding pressure (t/cm$^2$) | Weight (mg) $\overline{X}$ | $\sigma$n | $\sigma$n/$\overline{X}$ × 100 | Hardness (kg) $\overline{X}$ | $\sigma$n | Degrees of loss by abrasion % | Disintegrating property second |
|---|---|---|---|---|---|---|---|---|---|---|
| Ascorbic acid | A | 7 | 0.8 | 156.5 | 12.06 | 7.71 | 4.05 | 1.91 | 6.45 | 13 |
| | | 8 | 1.6 | 181.6 | 12.46 | 6.86 | 7.17 | 2.82 | 0.77 | 17 |
| | | 10 | 1.9 | 200.0 | 22.29 | 11.15 | 15.88 | 4.32 | 2.58 | 62 |
| " | B | 7 | 1.1 | 166.6 | 7.36 | 4.42 | 5.22 | 1.15 | 1.22 | 19 |
| | | 8 | 1.5 | 185.8 | 8.30 | 4.47 | 8.52 | 1.73 | 0.73 | 29 |
| | | 10 | 1.9 | 215.4 | 11.37 | 5.28 | 14.93 | 3.66 | 0.30 | 46 |

TABLE 3

| Pharmaceutically active ingredient | Disintegrator | Depths of filling (mm) | Tablet-molding pressure (t/cm$^2$) | Weight (mg) $\overline{X}$ | $\sigma$n | $\sigma$n/$\overline{X}$ × 100 | Hardness (kg) $\overline{X}$ | $\sigma$n | Degrees of loss by abrasion % | Disintegrating property second |
|---|---|---|---|---|---|---|---|---|---|---|
| Aspirin | A | 8 | 2.3 | 184.8 | 5.76 | 3.12 | 13.2 | 1.44 | 0.34 | 42 |
| | | 10 | 3.0 | 225.8 | 9.18 | 4.07 | 18.3 | 1.23 | 0.26 | 79 |

TABLE 3-continued

| Pharmaceutically active ingredient | Disintegrator | Depths of filling (mm) | Tablet-molding pressure (t/cm$^2$) | Weight (mg) $\overline{X}$ | $\sigma n$ | $\sigma n/\overline{X} \times 100$ | Hardness (kg) $\overline{X}$ | $\sigma n$ | Degrees of loss by abrasion % | Disintegrating property second |
|---|---|---|---|---|---|---|---|---|---|---|
| " | C | 8 | 2.3 | 191.6 | 3.18 | 1.66 | 14.7 | 1.07 | 0.34 | 49 |
|  |  | 10 | 3.0 | 232.4 | 5.18 | 2.23 | 20.1 | 1.01 | 0.26 | 104 |
| " | D | 8 | 2.4 | 196.0 | 2.96 | 1.51 | 15.7 | 0.94 | 0.34 | 65 |
|  |  | 10 | 3.5 | 237.9 | 4.97 | 2.09 | 20.2 | 0.80 | 0.24 | 107 |

Those tablets obtained by using disintegrators having a high bulk density (B, C and D) were smaller in their weight deviation and also in their hardness deviation, as compared with the tablets using the corresponding commercially available product (A). Further, those powder/granule compositions containing the disintegrators B, C and D were better in their filling property (fluidity) as compared with the composition containing the disintegrator A.

What is claimed is:

1. A process for the preparation of a powdery calcium cellulose glycolate comprising reacting cellulose glycolic acid in wet form with a calcium reagent, drying and pulverizing the resultant product, the calcium reagent being calcium hydroxide or a combination of calcium hydroxide and calcium carbonate.

2. The process of claim 1 wherein the water content of cellulose glycolic acid in wet form is 30–80% by weight.

3. The process of claim 1 wherein the reaction temperature is within the range of 30°–40° C.

4. The process of claim 1 wherein the calcium reagent is calcium hydroxide, which is dividedly added.

5. The process of claim 1 wherein the calcium reagent is a combination of calcium hydroxide and calcium carbonate at the molar ratio of 10 to 80/90 to 20.

6. The process of claim 5 wherein calcium carbonate is added to react with cellulose glycolic acid and calcium hydroxide is then added to react therewith.

7. The process of claim 6 wherein calcium hydroxide is added at least an hour after the addition of calcium carbonate.

8. The process of claim 5 wherein the molar ratio of calcium hydroxide to calcium carbonate is 10-20/90-80 and both are added at one time.

* * * * *